Nov. 30, 1948.  G. C. COOKE  2,454,991
VARIABLE SPEED TRANSMISSION
Filed Aug. 17, 1945  2 Sheets-Sheet 2
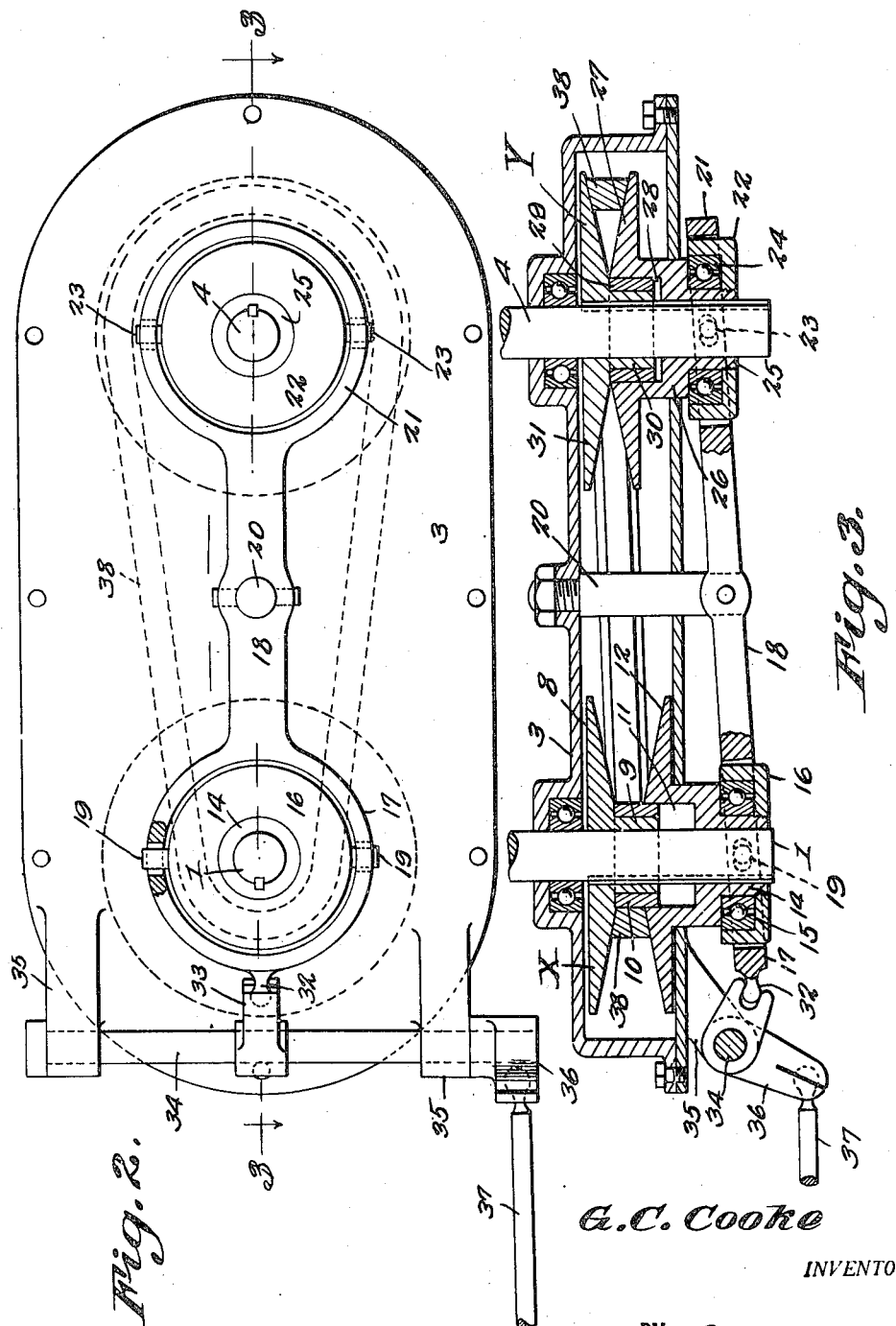
G. C. Cooke
INVENTOR.
BY
ATTORNEYS.

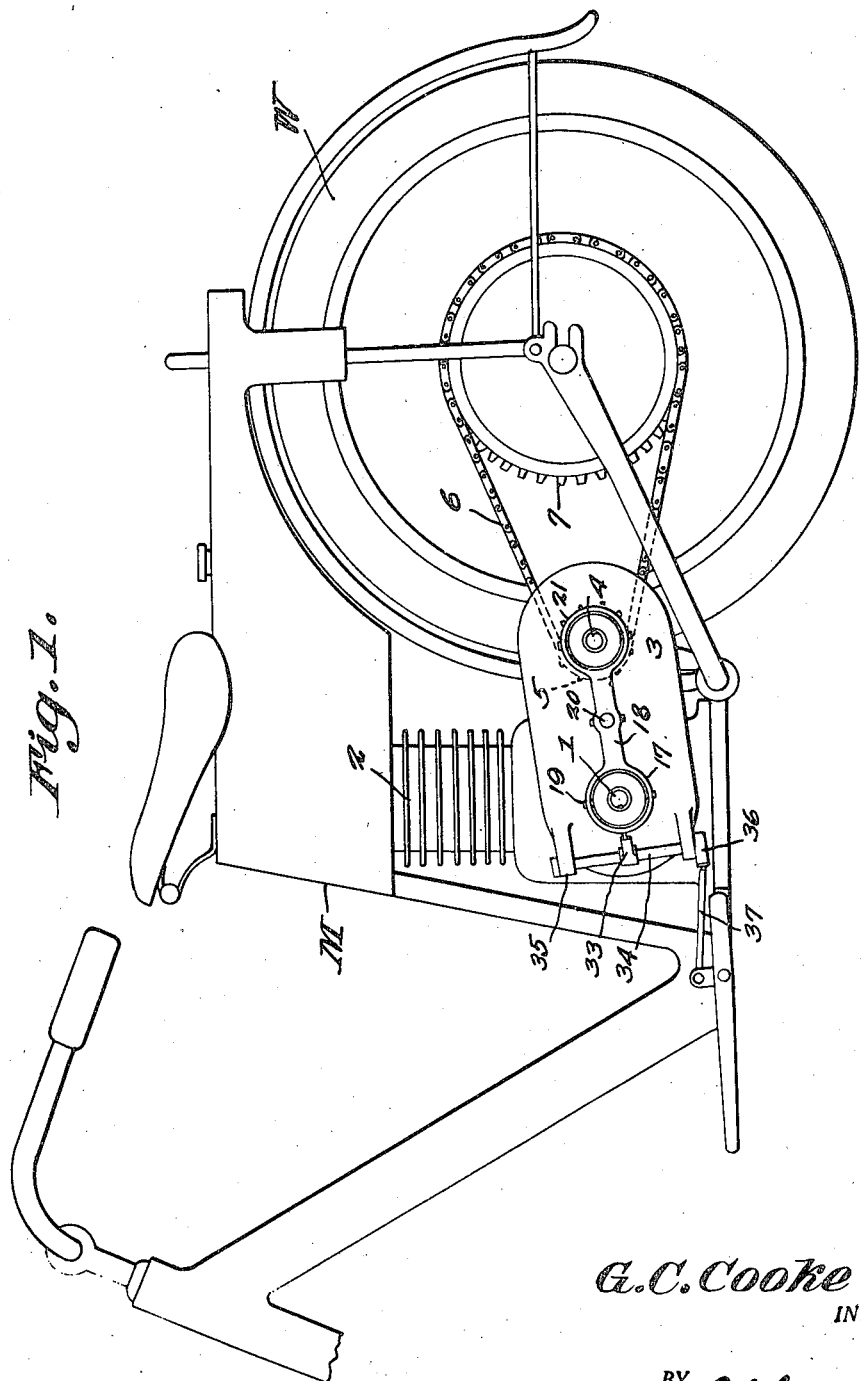

Patented Nov. 30, 1948

2,454,991

UNITED STATES PATENT OFFICE 2,454,991

VARIABLE-SPEED TRANSMISSION

Grady Carlyle Cooke, Winston-Salem, N. C.

Application August 17, 1945, Serial No. 611,041

1 Claim. (Cl. 74—230.17)

This invention relates to a transmission pulley for use in connection with a belt, one of the objects being to provide a pulley of new and novel construction whereby both variable speed and free wheeling are permissible without the use of complicated mechanism.

While the invention is especially useful in connection with the transmission of motor cycles, it obviously can be used wherever it is desirable to utilize a belt and pulley transmission and at the same time permit variations in speed and free wheeling, as desired.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings, the preferred form of the invention has been shown.

In said drawing,

Figure 1 is a side elevation of a portion of a motor cycle equipped with the present improvement.

Figure 2 is an enlarged side elevation of that portion of the driving mechanism constituting the present invention, a portion being broken away.

Figure 3 is a section on line 3—3, Figure 1.

Referring to the figures by characters of reference, 1 designates a main drive shaft adapted to be driven by any suitable type of motor 2 and journaled in one side of a housing 3. A counter shaft 4 is also journaled in said side of the housing and is parallel with shaft 1, it being designed to provide this counter shaft with a sprocket 5 whereby motion may be transmitted therefrom through a chain 6 to a sprocket 7 on one of the wheels W of a motor cycle M or other structure to be actuated.

A drive pulley X is mounted on the shaft 1 within the housing 3 and a driven pulled Y is mounted on the shaft 4 within the housing. Pulley X comprises a disk 8 forming one head or flange portion of the pulley and is provided with a cylindrical hub portion 9 extending from the center thereof, this hub portion as well as the head or disk 8 being keyed to the shaft 1. A rotatable sleeve 10 is carried by the hub and is adapted to revolve freely thereon. This sleeve and the hub extend into a cylindrical recess 11 provided in the central portion of another head or disk 12 constituting the opposite portion of the pulley X and provided with an outwardly extending hub 13 which is journaled in one wall of housing 3 and has a reduced outer end portion 14 journaled in a bearing 15 carried by a gimbal 16 which is pivotally mounted in a ring 17 at one end of a lever 18. The pivotal mounting of the gimbal has been indicated at 19. Lever 18 is mounted to swing on a pin 20 which extends through the housing at a point midway between the shafts 1 and 4 and the other end of this lever is provided with a ring 21 in which a gimbal 22 is pivotally mounted as at 23. A bearing 24 is carried by this gimbal and extending therethrough is the reduced end 25 of a hub 26 which is journaled in one side of housing 3 and is extended from the center of a disk 27 in which is formed a cylindrical recess 28. Into this recess is extended a sleeve 29 freely rotatable on a hub 30 extended from another disk 31 which, with the disk 27, forms the pulley Y. The disks 31 and 27 are of the same construction as disks 8 and 12 and, by reason of the lever connection between the disks 12 and 27, it will be obvious that when the lever 18 is swung in one direction, disk 12 will be pulled away from disk 8 while disk 27 will be thrust toward disk 31. Movement of the lever in the opposite direction will result in a reversal of the movement of these disks. To effect actuation of the lever, any suitable means may be employed. For example, a lug 32 can be extended from one end of the lever into engagement with a fork 33 carried by a rock shaft 34 mounted in suitable bearings 35. This rock shaft can be provided with a crank arm 36 to which an actuating rod 37 is pivotally joined as shown.

A belt 38 is extended between the disks of the two pulleys and as the inner or working faces of these disks diverge from the centers thereof, the belt 38 is tapered, as shown, so as to conform with the taper of the spaces between the disks of the pulleys.

The parts are so proportioned that when disk 27 is thrust inwardly toward disk 31 as far as it will go, the belt 38 will ride between the two disks adjacent to their peripheries and this positioning of the disk 27 will result in movement of disk 12 away from disk 8 so that belt 38 will thus ride on the sleeve 10. Consequently, as belt 38 thus is not gripped by the disks 8 and 12, shaft 1 can rotate without motion being transmitted to the belt. However, by gradually moving pulley disk 12 toward disk 8, the belt 38 will be gripped and as the pressure is increased, the pulleys 27 and 31 will move apart gradually so that the belt will thus serve to transmit motion from pulley X to pulley Y at a speed depending upon the distance of the belt from the periphery of pulley X. This distance will depend upon the relative movement of the disks, it being understood that the belt will always adjust itself to the positions of the disks.

What is claimed is:

A transmission including a housing, spaced pulleys mounted for rotation in the respective end portions of the housing, each pulley including spaced disks, a hub on one of the disks of each pulley, a sleeve freely rotatable on each hub, the other disk of each pulley having a recess for the reception of the hub and in which the sleeve is freely rotatable and slidable, hubs projecting from the outer faces of the recessed disks and journaled in one wall of the housing, the inner faces of the disks of each pulley diverging outwardly, a transversely tapered endless belt supported by and between the disks of the two pulleys, a centrally fulcrumed lever mounted on the outside of the housing, rings rigid with the ends of the lever, anti-friction bearings in the rings of the lever, the hub of the recessed disk of each pulley being journaled in and movable with one of said bearings, both bearings being supported for swinging movement in the rings, and drive and end-driven shafts operatively connected to the respective pulleys, aligned rock shaft bearings rigid with the housing, a rock shaft rotatably supported by said last named bearings, a fork carried by and rotable with the rock shaft, a pivotal connection between the fork and one of the rings, and means under the control of an operator for imparting rotatable movement to the rock shaft to shift the recessed disks in opposite directions respectively.

GRADY CARLYLE COOKE.

REFERENCES CITED

The following references are of record in the file of this patent:

UNITED STATES PATENTS

| Number | Name | Date |
|---|---|---|
| 2,101,084 | Meyers | Dec. 7, 1937 |
| 2,158,367 | Henney | May 16, 1939 |

FOREIGN PATENTS

| Number | Country | Date |
|---|---|---|
| 2,441 | Great Britain | June 19, 1879 |
| 4,449 | Great Britain | Feb. 21, 1913 |
| 72,542 | Switzerland | June 2, 1916 |